United States Patent
Rönnings et al.

(10) Patent No.: US 12,460,609 B2
(45) Date of Patent: Nov. 4, 2025

(54) AIR FILTER HOUSING AND AN AIR FILTER ELEMENT

(71) Applicant: VOLVO TRUCK CORPORATION, Gothenburg (SE)

(72) Inventors: Hans Rönnings, Gothenburg (SE); Carl Löwstedt, Onsala (SE); Mikael Karlsson, Gothenburg (SE); Sophie Girolami, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 365 days.

(21) Appl. No.: 17/904,262

(22) PCT Filed: Feb. 21, 2020

(86) PCT No.: PCT/EP2020/054655
§ 371 (c)(1),
(2) Date: Aug. 15, 2022

(87) PCT Pub. No.: WO2021/164885
PCT Pub. Date: Aug. 26, 2021

(65) Prior Publication Data
US 2023/0113536 A1    Apr. 13, 2023

(51) Int. Cl.
*F02M 35/024* (2006.01)
*F02M 35/02* (2006.01)

(52) U.S. Cl.
CPC .. *F02M 35/02416* (2013.01); *F02M 35/0205* (2013.01); *F02M 35/02475* (2013.01)

(58) Field of Classification Search
CPC ......... F02M 35/02416; F02M 35/0205; F02M 35/02475; B01D 46/0047; B01D 46/2414;
(Continued)

(56) References Cited

U.S. PATENT DOCUMENTS

| 6,217,627 B1 | 4/2001 | Vyskocil et al. |
| 9,682,341 B2 | 6/2017 | Williams et al. |

(Continued)

FOREIGN PATENT DOCUMENTS

| CN | 101060906 A | 10/2007 |
| CN | 101060908 A | 10/2007 |

(Continued)

OTHER PUBLICATIONS

Chinese Office Action dated Dec. 21, 2023 in corresponding Chinese Patent Application No. 202080096448.1, 18 pages.
(Continued)

*Primary Examiner* — Lindsay M Low
*Assistant Examiner* — Charles J Brauch
(74) *Attorney, Agent, or Firm* — Venable LLP; Jeffri A. Kaminski

(57) ABSTRACT

An air filter housing has an inner housing space adapted to receive an air filter element. The air filter housing includes a first housing end and a second housing end located axially opposite the first housing end in relation to the inner housing space, and an outlet pipe extending from the second housing end axially into the inner housing space. The outlet pipe has a center axis and an opening configured to receive clean air from the inner housing space, wherein at least an axial portion of the outlet pipe has a cross-sectional area along a geometrical plane perpendicular to the centre axis which is tapering.

19 Claims, 6 Drawing Sheets

(58) Field of Classification Search
CPC .............. B01D 46/4236; B01D 46/521; B01D 46/0005

See application file for complete search history.

(56) References Cited

U.S. PATENT DOCUMENTS

| | | | |
|---|---|---|---|
| 10,556,199 | B2 | 2/2020 | Luchesi De Almeida et al. |
| 2005/0061292 | A1* | 3/2005 | Prellwitz ................ B01D 46/24 123/198 E |
| 2006/0157403 | A1 | 7/2006 | Harder et al. |
| 2009/0249754 | A1 | 10/2009 | Amirkhanian et al. |
| 2014/0223874 | A1 | 8/2014 | Kaufmann et al. |
| 2016/0102637 | A1 | 4/2016 | Desjardins |
| 2016/0220935 | A1 | 8/2016 | Ruhland et al. |
| 2018/0257011 | A1 | 9/2018 | Boden et al. |
| 2018/0369732 | A1 | 12/2018 | Karlsson et al. |
| 2019/0046904 | A1 | 2/2019 | Noren et al. |

FOREIGN PATENT DOCUMENTS

| | | |
|---|---|---|
| CN | 102015062 A | 4/2011 |
| CN | 103547352 A | 1/2014 |
| CN | 104220142 A | 12/2014 |
| CN | 108136296 A | 6/2018 |
| CN | 108367221 A | 8/2018 |
| CN | 108412645 A | 8/2018 |
| CN | 108472568 A | 8/2018 |
| CN | 108472569 A | 8/2018 |
| EP | 0823548 A2 | 2/1998 |
| EP | 2364763 B1 | 9/2011 |
| EP | 2247364 B1 | 4/2014 |
| EP | 3352880 A1 | 8/2018 |
| GB | 2450735 A | 1/2009 |
| WO | 2012172020 A2 | 12/2012 |
| WO | 2013063497 A2 | 5/2013 |
| WO | 2017050365 A1 | 3/2017 |
| WO | 2017050366 A1 | 3/2017 |
| WO | 2017102027 A1 | 6/2017 |
| WO | 2017103048 A1 | 6/2017 |
| WO | 18111822 A1 | 6/2018 |
| WO | 2019219636 A1 | 11/2019 |
| WO | 2019238212 A1 | 12/2019 |

OTHER PUBLICATIONS

International Search Report and Written Opinion in corresponding International Application No. PCT/EP2020/054655 mailed Oct. 22, 2020 (13 pages).
International Preliminary Report on Patentability in corresponding International Application No. PCT/EP2020/054655 mailed Feb. 14, 2022 (6 pages).
Chinese Office Action dated Mar. 1, 2024 in corresponding Chinese Patent Application No. 202080096474.4, 18 pages.
Final Office Action dated Oct. 8, 2024 in corresponding U.S. Appl. No. 18/003,051, 16 pages.
International Search Report and Written Opinion in corresponding International Application No. PCT/EP2020/054659 mailed Oct. 21, 2020 (13 pages).
Second Written Opinion of the International Preliminary Examining Authority in corresponding International Application No. PCT/EP2020/054659 mailed Jan. 28, 2022 (5 pages).
International Preliminary Report on Patentability in corresponding International Application No. PCT/EP2020/054659 mailed May 23, 2022 (6 pages).
Non-Final Office Action dated Jan. 24, 2025 in corresponding U.S. Appl. No. 18/003,051, 17 pages.
International Search Report and Written Opinion of the International Searching Authority in corresponding International Application No. PCT/EP2020/068884 mailed Sep. 3, 2020 (14 pages).
International Preliminary Report on Patentability in corresponding International Application No. PCT/EP2020/068884 mailed May 16, 2022 (8 pages).
Non Final Office Action dated Nov. 15, 2024 in corresponding U.S. Appl. No. 17/904,272, 19 pages.
Final Office Action dated Apr. 29, 2025 in corresponding U.S. Appl. No. 17/904,272, 22 pages.
Notice of Allowance dated Jun. 4, 2025 in corresponding U.S. Appl. No. 18/003,051, 14 pages.
Non Final Office Action dated Sep. 17, 2025 in corresponding U.S. Appl. No. 17/904,272, 23 pages.

* cited by examiner

AIR FILTER HOUSING AND AN AIR FILTER ELEMENT

CROSS-REFERENCE TO RELATED APPLICATIONS

This application is a U.S. National Stage application of PCT/EP2020/054655, filed Feb. 21, 2020 and published on Aug. 26, 2021, as WO 2021/164885, all of which is hereby incorporated by reference in its entirety.

TECHNICAL FIELD

The present invention relates to an air filter housing and to an air filter element. The air filter element may alternatively be called filter cartridge, filter module or filter insert. The invention further relates to an air filter system comprising an air filter element and an air filter housing, to a lid for an air filter housing, and to an internal combustion engine system and a vehicle.

BACKGROUND

Filters are widely used in vehicles. It is e.g. well known to provide an air filter for cleaning intake air for use in an internal combustion engine. Other equipment and components in the vehicle, such as a e.g. compressor for the brake system, may also use clean air from an air filter. Besides air filters, there are other types of filters in a vehicle, e.g. oil filters. The filters can be designed in many different shapes and have various configurations.

An air filter, or an air filter system, typically comprises an air filter element comprising a filter body through which the air is filtered, and a filter housing in which the air filter element is installed. The air filter element is typically replaced on a regular basis to keep the performance of the air filter system, and of the equipment and components utilizing the filtered air, at a desired level.

When the air filter element is to be replaced (or be subject to maintenance), the air filter element is removed from the filter housing, and a new (or cleaned) air filter element is inserted and installed into the filter housing. One particular problem when installing the air filter element in the filter housing is to align the air filter element within the filter housing. This is especially cumbersome for air filter systems in which the outlet of the air filter element needs to be aligned with the corresponding outlet of the filter housing, or when the air filter system comprises two oppositely arranged outlets supplying clean air to e.g. both the internal combustion engine and an auxiliary component, as e.g. disclosed in US 2005/0061292 A1, and the air filter element needs to be aligned in the filter housing so the first and second outlets of the air filter element aligns with the first and second housing outlets, respectively. Many air filter elements and corresponding filter housings, as e.g. disclosed in US 2005/0061292 A1, are also complex and bulky, leading to extended assembly time and inefficient use of space. Moreover, the bulkiness may also have a negative effect on noise optimized tuning of the intake system.

There is thus a need in the industry for an improved air filter system.

SUMMARY

It is an object of the present disclosure to at least to some extent alleviate the shortcomings discussed above in relation to known filters, and to improve an air filter element and air filter housing, especially for the installation of the air filter element relative the air filter housing.

According to at least a first aspect of the present invention, an air filter housing is provided. The air filter housing comprises an inner housing space adapted to receive an air filter element, the air filter housing comprising a first housing end and a second housing end located axially opposite the first housing end in relation to the inner housing space, and an outlet pipe extending from the second housing end axially into the inner housing space, the outlet pipe having a centre axis and an opening configured to receive clean air from the inner housing space, wherein at least an axial portion of the outlet pipe has a cross-sectional area along a geometrical plane perpendicular to the centre axis which is tapering.

Hereby, the air filter housing can be adapted to connect to air filter elements having a corresponding structure. Thus, at least the insertion and housing of an air filter element in/into the air filter housing is improved.

According to at least one example embodiment, the axial portion of the outlet pipe is configured and arranged to mate with a corresponding opening of the air filter element. According to at least one example embodiment, the outlet pipe, such as the whole outlet pipe, is configured and arranged to mate with the corresponding opening of the air filter element.

The inventors have realized that by having a tapering cross-sectional area of the outlet pipe, or as specified above, a tapering cross-sectional area of at least said axial portion of the outlet pipe, the outlet pipe acts as a fixation element relative an air filter element, when the air filter element is installed into the air filter housing. That is, the tapering cross-sectional area prevents the air filter element to move in the radial plane, such as e.g. prevents the air filter element to rotate within the air filter housing, and thus, fixates, or locks, the air filter element in the radial plane (i.e. a geometrical plane coinciding or being parallel to said cross-sectional area of the outlet pipe or axial portion of the outlet pipe). Hereby, the air filter element is locked in at least two directions being perpendicular to each other.

According to at least one example embodiment, the cross-sectional area is tapering with an inclination defined by an angle between two intersecting sides of the cross-sectional area smaller than 90 degrees, such as smaller than 80 degrees, e.g. between 10 degrees and 80 degrees.

Thus, according to at least one example embodiment, the axial portion of the outlet pipe is configured to prevent the air filter element to rotate, and/or move in the radial plane, when the air filter element is installed in the air filter housing. Thus, the outlet pipe is configured to at least radially fixate an air filter element installed in the air filter housing.

It should be understood that the axial portion is a portion of the outlet pipe extending axially into the inner housing space. Moreover, it should be understood that the geometrical plane perpendicular to the centre axis is typically a plane in the radial direction of the air filter housing.

It should be understood that the axial direction of the air filter housing is parallel to, or coinciding with, a longitudinal direction of the air filter housing, and that the axial direction of the outlet pipe is parallel to, or coinciding with a longitudinal direction of the outlet pipe. In the embodiment mentioned above, the longitudinal direction of the air filter housing is also parallel to, or coincides with, the longitudinal direction of the outlet pipe.

According to at least one example embodiment, the piping walls defining the cross-sectional area of the outlet pipe, or the axial portion of the outlet pipe, is shaped to have at least two oppositely wall portions angled relative each other. For example, the piping walls may comprise first and second wall portions being parallel to each other, and third and fourth wall portions connecting the first and second wall portions on opposite sides to each other. The first and second wall portions are typically of different lengths, whereby each one of, or at least one of, the third and fourth wall portions is inclined with respect to the longest of the first and second wall portion with an angle of less than 90 degrees, typically below 80 degrees, e.g. between 10 degrees and 80 degrees.

According to at least one example embodiment, the cross-sectional area of the axial portion of the outlet pipe is shaped as a trapezoid, or truncated triangle. Hereby, fixation, or locking, in at least two directions are achieved.

According to at least one example embodiment, the cross-sectional area of the axial portion of the outlet pipe is shaped as a triangle.

According to at least one example embodiment, the cross-sectional area of the axial portion of the outlet pipe is non-circular. According to at least one example embodiment, the cross-sectional area of the axial portion of the outlet pipe is polygonal.

According to at least one example embodiment, the cross-sectional area of the axial portion of the outlet pipe has rounded corners. Hereby, the flow conditions through the outlet pipe is improved.

It should be understood that the cross-sectional area is measured in a geometrical plane, e.g. the radial plane, extending perpendicular to the axial or longitudinal direction of the outlet pipe. Stated differently, the centre axis of the outlet pipe is a normal to said cross-sectional area.

According to at least one example embodiment, the opening of the outlet pipe is sized and dimensioned to match the tapering cross-sectional area of the axial portion.

According to at least one example embodiment, the outlet pipe comprises a first leading edge and a second leading edge, each one of the first and second leading edges at least partly defining the opening, wherein the first and second leading edges are arranged upstream of said axial portion of the outlet pipe.

That is, upstream in relation to the flow of air from the air filter housing, out through the outlet pipe, and further to e.g. auxiliary equipment, such as e.g. brake compressors. In other words, the first and second leading edges are arranged axially further away from the second housing end compared to the axial portion of the outlet pipe. Hereby, one portion of the outlet pipe, i.e. the opening of the outlet pipe, can be adapted based on a first criteria, e.g. noise reduction, while another portion of the outlet pipe, i.e. said axial portion arranged downstream of the opening, can be adapted based on a second criteria, e.g. mating with a corresponding opening/outlet of the air filter element.

According to at least one example embodiment, the first leading edge and/or the second leading edge is configured and arranged to fixate/lock an installed air filter element in the air filter housing, and configured to prevent the air filter element to move in the radial plane and/or rotate within the air filter housing.

According to at least one example embodiment at least one of the first and second leading edges comprises a sinusoidal portion.

A sinusoidal portion may reduce noise travelling through the outlet pipe. The sinusoidal portion is typically formed by peaks and valleys axially distant from each other. In other words, the portion is sinusoidal in a cross section along the axial direction of the outlet pipe.

Stated differently, the first and/or second leading edge is shaped to reduce noise travelling through the outlet pipe. This may e.g. be made by the sinusoidal portion mentioned above.

According to at least one example embodiment, the first leading edge is axially offset to said second leading edge, such that the opening is at least partly extending in the axial direction.

Hereby, the outlet pipe may be installed such that the opening is directed in the inner housing space in a desired manner.

According to at least one example embodiment, the second leading edge is arranged closer to the second housing end compared to the first leading edge. Thus, an axial distance between the second housing end and the first leading edge is larger than an axial distance between the second housing end and the second leading edge. By having the first leading edge axially offset to the second leading edge in this manner, the first leading edge will lead the alignment and interconnection with the corresponding opening of the air filter element. That is, the first leading edge will be the part of the outlet pipe which firstly interacts with the corresponding opening of the air filter element during installation of the air filter element in the air filter housing. Hereby, the fixation, or alignment, of the air filter element in the air filter housing may be carried out in a two-step procedure, firstly the first leading edge will interact with the corresponding opening of the air filter element, to initially align the air filter element in the air filter housing, and secondly, as the outlet pipe is inserted further into the corresponding opening of the air filter element, said axial portion of the outlet pipe will further, or finally, align the air filter element to the air filter housing owing to the matching cross-sectional areas of said axial portion and the corresponding opening of the air filter element.

Stated differently, the outlet pipe comprises a first portion, or an opening portion, which has an open (partly non-bounded) cross-sectional area in the geometrical plane being perpendicular to the axial direction of the outlet pipe, and being at least partly defined by the shape of the first leading edge, and comprises a second portion, or said axial portion, which has a closed (fully bounded) cross-sectional area in the geometrical plane being perpendicular to the axial direction of the outlet pipe. The open cross-sectional area may e.g. be "U-shaped" defined by two vertical legs, and a connecting horizontal leg, where at least one of the vertical legs are inclined relative the horizontal leg. By the combination of having a first portion with an open cross-sectional area leading the insertion of the outlet pipe into the corresponding opening of the air filter element, and having a second portion with a closed cross-sectional area trailing the insertion of the outlet pipe into the corresponding opening of the air filter element, the above mentioned two-step procedure of alignment and fixation of the air filter element to the air filter housing can be realized.

According to at least one example embodiment, the first leading edge comprises a first lateral portion, a second lateral portion, and a transversal portion connecting the first lateral portion with the second lateral portion such that the second lateral portion is located opposite to the first lateral portion in relation to the transversal portion, wherein at least one of the first and second lateral portions are inclined relative the transversal portion with an angle of less than 90 degrees, such as e.g. less than 80 degrees, e.g. between 10 degrees and 80 degrees. This arrangement may form the above-mentioned first portion, or opening portion, with the open cross-sectional area. This arrangement may furthermore form at least a sub-portion of the cross-sectional area of the axial portion of the outlet pipe.

By having the above mentioned arrangement wherein at least one of the first and second lateral portions are inclined relative the transversal portion with an angle of less than 90 degrees, such as e.g. less than 80 degrees, the air filter element may be fixated/aligned in at least two directions as soon as the first leading edge of the outlet pipe is inserted into the corresponding opening of the air filter element. Thus, the first portion, or opening portion, of the outlet pipe may align and fixate the air filter element in the air filter housing in at least two directions upon entering of the first portion into the corresponding opening of the air filter element.

It should be understood that the above mentioned fixation in at least two directions typically refer to as a fixation in the radial plane, or a geometrical plane perpendicular to the axial direction of the outlet pipe.

According to at least one example embodiment, the air filter housing further comprises a radial gasket arranged circumferentially of the outlet pipe, typically downstream of said axial portion. Hereby, the air filter element may be axially fixated to the air filter housing. The radial gasket is typically arranged on the outlet pipe close to, or adjacent to, the second housing end.

According to at least one example embodiment, outlet pipe further comprises a first axial edge portion connecting a first end of the first leading edge with a first end of the second leading edge, and a second axial edge portion connecting a second end of the first leading edge with a second end of the second leading edge, such that the first and second leading edges together with the first and second axial edge portions defines the opening of the outlet pipe. Both the first and second axial edge portions extending axially, or substantially axially, in the inner housing space.

According to at least one example embodiment, the opening is facing away from a centre axis of the air filter housing.

Hereby, the opening is arranged to face the air filter element when the latter is installed in the air filter housing, and may thus receive filtered air directly from the air filter element.

According to at least one example embodiment, the centre axis of the outlet pipe is arranged parallel to the centre axis of the air filter housing, wherein the centre axis of the outlet pipe is offset in relation to the centre axis of the air filter housing in a direction perpendicular to the centre axes.

According to at least one example embodiment, the outlet pipe is adapted for conveying clean air to an auxiliary component of a vehicle. The auxiliary component may e.g. be the brake compressors.

According to at least one example embodiment, the air filter housing further comprises a housing inlet for receiving air, and an engine outlet for conveying clean air to an engine of a vehicle, the engine outlet being located in the first housing end, wherein the outlet pipe and the engine outlet are in communication with the inner housing space, wherein the centre axis of the outlet pipe and the centre axis of the engine outlet are parallel, and arranged at an offset position in relation to one another in a direction perpendicular to the extension of the centre axes.

The engine outlet of the air filter housing may be referred to as a first housing outlet, and the outlet pipe of the air filter housing may be referred to as a second housing outlet.

According to at least one example embodiment, said offset position involves a distance, and preferably is a distance, in the transversal direction of said air filter housing. According to at least one example embodiment, said offset position is a mutual distance as seen in the transversal direction of the air filter housing between a centre point in engine outlet and a centre point in the outlet pipe.

According to at least one example embodiment, the first housing end is located in parallel relationship with the second housing end.

According to at least one example embodiment, a cross-sectional area of the outlet pipe is smaller than a cross-sectional area of the engine outlet. Such cross-sectional area is measured in the same manner as previously descried, i.e. in a geometrical plane being perpendicular to the centre axis of the outlet pipe and engine outlet, respectively. This improves the acoustic response of the air filter housing, and enables a compact design.

According to at least one example embodiment, the air filter housing has a cross-sectional shape which has a first extension in a first direction and a second extension in a second direction, wherein said first extension is greater than said second extension, said second extension preferably being perpendicular to said first extension and that said cross-sectional shape is generally elliptical. The first extension may alternatively be equal to the second extension.

According to at least one example embodiment, the housing inlet is located in an envelope surface of the air filter housing. This enables a compact design of the air filter housing. According to at least one example embodiment, the housing inlet is located in the envelope surface at a position coinciding with the first extension direction. According to at least one example embodiment, the housing inlet is located on an opposite side of a middle point of said air filter housing in relation to said outlet pipe. This enables an increase of the offset position between the housing inlet and of the outlet pipe or second housing outlet.

According to at least one example embodiment, the air filter housing has a tubular shape. This enables a compact design of the air filter housing. According to at least one example embodiment, a direction of said offset position between said engine outlet and the outlet pipe coincides with the first extension direction. According to at least one example embodiment, said engine outlet is located coaxially with said filter housing.

According to at least one example embodiment, the air filter housing further comprising a housing lid, the housing lid comprising, or encompassing, the second housing end of the air filter housing and encompassing the outlet pipe. Moreover, when the air filter element is installed into the air filter housing, and the housing lid closes the inner housing space. This provides for closing and possibly sealing of the air filter housing.

Thus, the air filter housing may be comprised of at least two parts, a first air filter housing part including the first housing end, and a second air filter housing part being the housing lid. Thus, the first air filter housing part is configured to house a majority of the air filter element, and the second air filter housing part is configured to close the air filter element in the inner housing space.

According to at least one example embodiment, the housing lid comprises a protruding pipe portion for connection to an adjoining pipe. The protruding pipe portion may have an extension away from the inner housing space. Having an adjoining pipe connected to the air filter housing provides for an easier attachment to an auxiliary component.

According to at least a second aspect of the invention, an air filter element is provided. The air filter element comprising a first end and a second end located opposite to the first end in relation to a longitudinal direction of the air filter element, the air filter element being configured for axial insertion into an air filter housing with the first end leading the axial insertion, wherein the air filter element comprises a first outlet located in the first end and being configured to communicate with a corresponding first housing outlet in the air filter housing, and a second outlet located in the second end and being configured to communicate with a corresponding second housing outlet in the air filter housing, wherein a cross-sectional area of the second outlet is tapering.

Hereby, the air filter element can be adapted to connect to the air filter housing of the first aspect of the invention, as the second outlet is the above-mentioned corresponding opening of the air filter element, and thus has a corresponding cross-sectional area as the second housing outlet, being embodied by said axial portion of the outlet pipe as described in the first aspect of the invention. Thus, at least the insertion and housing of the air filter element in/into the air filter housing is improved. As mentioned above, the first housing outlet may be referred to as an engine housing outlet, and the second housing outlet may be referred to, and embodied by, the outlet pipe.

According to at least one example embodiment, the second outlet is configured and arranged to mate with the second housing outlet, or outlet pipe, of the air filter housing, such that air may flow via the second outlet of the air filter element and the opening of the outlet pipe of the air filter housing. According to at least one example embodiment, the second outlet is configured and arranged to mate with the outlet pipe, such as the whole outlet pipe, of the air filter housing. According to at least one example embodiment, the second outlet is provided with an axial gasket to seal against the outlet pipe.

The inventors have realized that by having a tapering cross-sectional area of the second outlet, the air filter element may be fixated against the air filter housing, as e.g. inner walls of the second outlet may act as a fixation element relative the outlet pipe, when the air filter element is installed into the air filter housing. That is, the tapering cross-sectional area prevents the air filter element to move in the radial plane, or rotate within the air filter housing and thus, fixates, or locks, the air filter element in at least two directions, e.g. locks the air filter element in the radial plane (i.e. a geometrical plane parallel to said cross-sectional area of the outlet pipe or axial portion of the outlet pipe).

According to at least one example embodiment, the cross-sectional area is tapering with an inclination defined by an angle between two intersecting sides of the cross-sectional area smaller than 90 degrees, such as smaller than 80 degrees, e.g. between 10 degrees and 80 degrees.

Thus, according to at least one example embodiment, the second outlet is configured to prevent the air filter element to rotate, and/or move in the radial plane, when the air filter element is installed in the air filter housing. Thus, the second outlet is configured to at least radially fixate the air filter element when being installed in the air filter housing.

It should be understood that the axial direction of the air filter element is parallel to, or coinciding with, a longitudinal direction of the air filter element.

According to at least one example embodiment, the cross-sectional area of the second outlet is shaped as a trapezoid, or truncated triangle. Hereby, fixation, or locking, in at least two directions are achieved.

According to at least one example embodiment, the cross-sectional area of the second outlet is shaped as a triangle.

According to at least one example embodiment, the cross-sectional area of the second outlet is non-circular. According to at least one example embodiment, the cross-sectional area of the second outlet is polygonal.

According to at least one example embodiment, the cross-sectional area of second outlet has rounded corners. Hereby, the flow conditions through the second outlet is improved.

It should be understood that the cross-sectional area is measured in a geometrical plane, e.g. the radial plane, extending perpendicular to the centre axis of the second outlet (the centre axis may run along the axial or longitudinal direction of a pipe, or axial portion encompassing the second outlet). Stated differently, the centre axis of the second outlet is a normal to said cross-sectional area.

According to at least one example embodiment, the second outlet is sized and dimensioned to match the tapering cross-sectional area of the axial portion of the outlet pipe.

It should be understood that the cross-sectional area of the second outlet is typically larger than that of the axial portion of the outlet pipe, as the outlet pipe is to be inserted into the second outlet during installation of the air filter element into the air filter housing.

According to at least one example embodiment, the air filter element comprises a filter body arranged between the first and second ends of the air filter element, the filter body forming an outer sleeve surface configured to receive unfiltered air. The filter body may further comprise an inner sleeve surface configured to discharge filtered air. That is, during use, the filter body is arranged in the air filter element to receive unfiltered air to said outer sleeve, filter the air through the filter body, and discharge or release the filtered air from said inner sleeve. The filter body may e.g. be shaped as a hollow cylinder or hollow cone (i.e. be cylindrical or conical in shape), wherein the outer and inner sleeves form the outer and inner envelope surfaces of such hollow cylinder or cone, respectively.

According to at least one example embodiment, the filter body may be pleated. Hereby, the contact surface between the air and the filter material in the filter body may be increase. Preferably, the filter body is made of a filter material chosen from the group of: paper and cellulose. These materials are common materials and enables low manufacturing costs.

According to at least one example embodiment, the air filter element further comprises a first end panel at the first end of the air filter element, and a second end panel at the second end of the air filter element.

The first outlet of the air filter element is typically adapted for conveying clean air to an internal combustion engine of a vehicle. The second outlet of the air filter element is typically adapted for conveying clean air to an auxiliary component of the vehicle.

According to at least one example embodiment, the air filter element has a tubular shape defining an inner space in communication with the first and second outlets, the first outlet having a first centre axis and the second outlet having a second centre axis parallel and arranged at an offset position in relation to the first centre axis in a direction perpendicular to the first and second centre axes.

This improves the acoustic response when using the air filter element. The offset position involves a distance, and preferably is a distance, in the transversal direction (e.g. radial direction) of the air filter element, the offset position is a mutual distance as seen in the transversal direction of the air filter element between a centre point in the first outlet and a centre point in the second outlet.

According to at least one example embodiment, the first end panel houses the first outlet, and is arranged to block any filtered fluid to exit the air filter element axially through the first end panel, other than through the first outlet. This provides a simple design and for enabling a proper sealing effect between the air filter element and a filter housing when installed therein. Moreover, this provides for a certain air flow and for a desired flow and filtration performance.

According to at least one example embodiment, the second end panel houses the second outlet, and is arranged to block any filtered fluid to exit the air filter element axially through the second end panel other than through the second outlet. This enables a correct fluid flow without any leakage, and thereby an improved filtering performance. Moreover, the acoustic response of the air filter element is improved, as well as a minimising of any interference between the respective flows of fluid through the first and second outlets is achieved. Thus, a controlled flow of filtered air, through the first and second outlets of the air filter element is provided.

According to at least one example embodiment, the air filter element has a cross-sectional shape with a first extension in a first direction and a second extension in a second direction which is perpendicular to said first direction. The first extension may according to one example embodiment greater than the second extension, such that the cross-sectional shape is oval, preferably generally elliptical. This enables locating the second outlet at an offset position in relation to the first outlet at an increased distance compared to for example a circular shape, thereby allowing for a further increased distance between the second outlet and the first outlet in order to improve the acoustic response. The first extension may alternatively be equal to the second extension.

According to at least one example embodiment, the above-mentioned offset position of the second outlet in relation to the first outlet is along the first extension direction. According to at least one example embodiment, the first outlet has a generally cylindrical cross-section. According to at least one example embodiment, the first outlet is located coaxially with the air filter element. According to at least one example embodiment, a cross-sectional shape and dimension of the first outlet is substantially the same as a cross-sectional shape and dimension of the inner space of the air filter element. According to at least one example embodiment, a cross-sectional area of the second outlet is substantially smaller than a cross-sectional area of the inner space of the air filter element. According to at least one example embodiment, a cross-sectional area of the second outlet is substantially smaller than a cross-sectional area of the first outlet. According to at least one example embodiment, a cross-sectional shape of the second outlet is tapering (i.e. substantially the same as a cross-sectional shape of the axial portion of the outlet pipe of the air filter housing), wherein a cross-sectional dimension of the second outlet is substantially smaller than a cross-sectional dimension of the first outlet. This improves the acoustic response of the air filter element, and enables a compact design.

According to at least one example embodiment, the air filter element is adapted to be removably arranged in the air filter housing.

Hereby, the air filter element can be removed from the air filter housing, be subject to maintenance, and subsequently re-inserted into the air filter housing. Alternatively, a new air filter element, corresponding to the removed air filter element, can be inserted into the air filter housing. The air filter element may e.g. be configured to be supplied to a filter system of an internal combustion engine in a vehicle.

According to at least a third aspect of the invention, a filter system comprising an air filter element according to the second aspect of the invention, and an air filter housing according to the first aspect of the invention is provided. The second outlet of the air filter element is sized and dimensioned to mate with the outlet pipe of the air filter housing.

Effects and features related to this third aspect of the present invention are largely analogous to those described above in connection with the first and second aspects of the invention. Embodiments mentioned in the first and second aspects of the invention are applicable to this third aspect of the invention.

Thus, the first housing end is arranged adjacent to, and facing, the first end of the air filter element, and the second housing end is arranged adjacent to, and facing, the second end of the air filter element, when the air filter element is housed in said inner housing space of the air filter housing. The air filter element thus comprises an engine outlet (i.e. the first outlet) located in the first end of the air filter element and being configured to communicate with the engine outlet (i.e. the first housing outlet) of the air filter housing, and comprises an auxiliary equipment outlet (i.e. the second outlet) located in the second end of the air filter element and being configured to communicate with the outlet pipe (i.e. the second housing outlet) of the air filter housing. Hereby, the first outlet of the air filter element is coaxial and aligned with the engine outlet of the air filter housing, for conveying clean air to an internal combustion engine, and the above mentioned second outlet of the air filter element is coaxial and aligned with the outlet pipe of the air filter housing for conveying clean air to an auxiliary component.

According to at least one example embodiment, the inner housing shape of the air filter housing is adapted to match to an outer shape of the air filter element. This provides for the air filter housing to correspond to the air filter element, such that a fluid to be filtered is generally evenly spread between the air filter housing and the air filter element to fully utilize the filtering operation of the air filter element. Moreover, the air filter element can snuggly be fitted into the air filter housing.

According to at least one example embodiment, the air filter element is adapted to be removably arranged in the air filter housing.

According to at least one example embodiment, the cross-sectional area of said axial portion of the outlet pipe is sized and dimensioned to correspond to the cross-sectional area of the second outlet of the air filter element, such that the outlet pipe, upon installation of the air filter element in the air filter housing, is inserted into the second outlet.

Hereby, the air filter element is fixated in a radial plane, and is e.g. prevented from rotating relative the air filter housing.

According to at least a further aspect of the invention, a lid for an air filter housing having an inner housing space is provided. The lid comprises a first surface configured to face the inner housing space, and an outlet pipe extending axially outwardly from the first surface, the outlet pipe having a centre axis and an opening configured to receive clean air from the inner housing space, wherein at least an axial portion of the outlet pipe has a cross-sectional area along a geometrical plane perpendicular of the centre axis which is tapering.

Thus, the lid of the fourth aspect of the invention is analogous to the housing lid described in the first aspect of the invention. Effects and features related to this fourth aspect of the present invention are largely analogous to those described above in connection with the first aspect of the invention. Embodiments mentioned in the first aspect of the invention, applicable to the housing lid of the first aspect of the invention, are applicable to this fourth aspect of the invention.

According to at least one example embodiment, the lid may further comprise a second surface arranged opposite to the first surface, and thus arranged to face away from an inner housing space of the air filter housing.

According to at least a fifth aspect of the present invention, an internal combustion engine is provided. The internal combustion engine comprises a filter system according to the third aspect of the invention.

According to at least a sixth aspect of the present invention, a vehicle is provided, the vehicle comprising an internal combustion engine according to the fifth aspect of the present invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
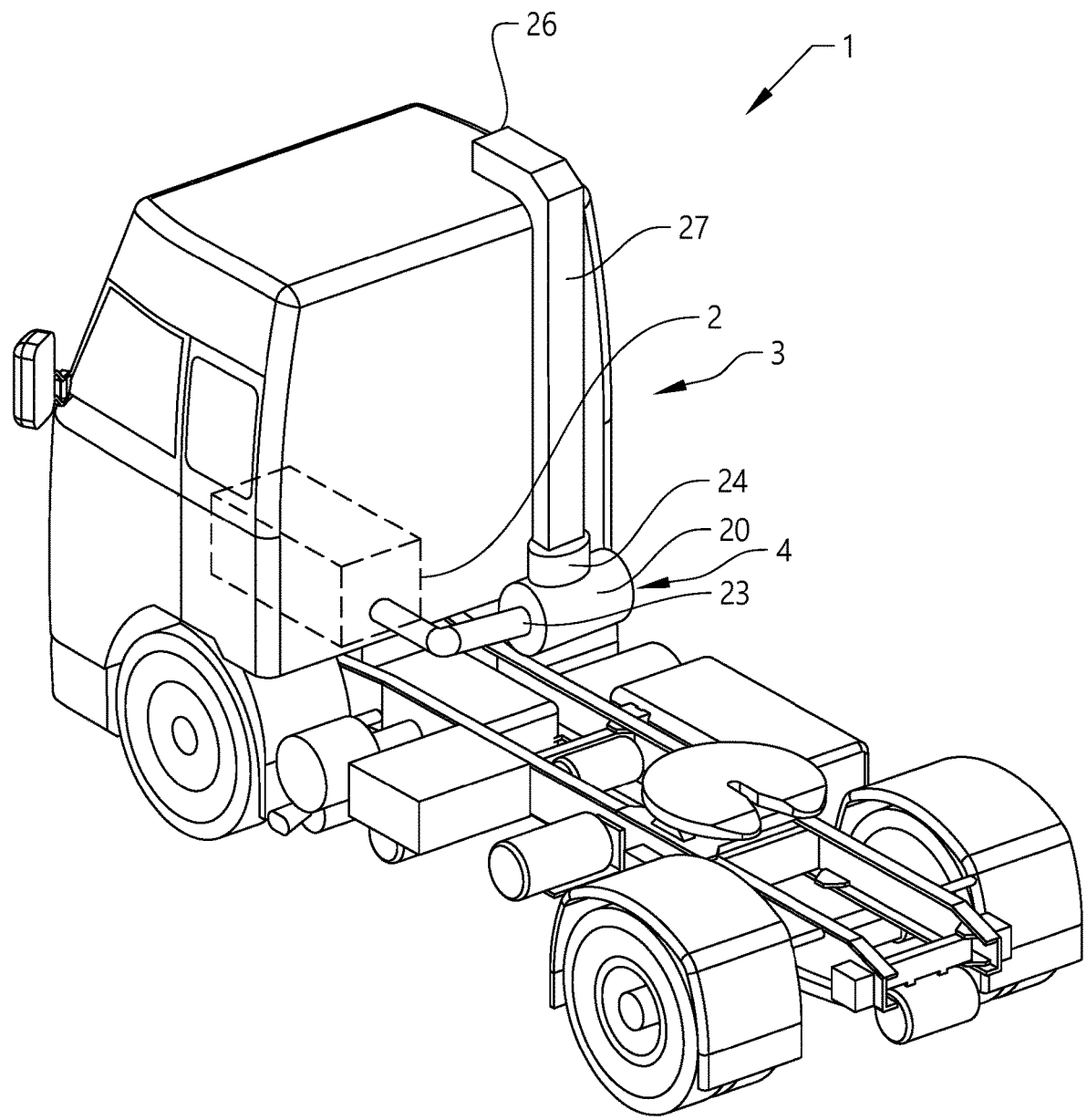
FIG. 1 illustrates a vehicle carrying a filter housing and an air filter element according to this disclosure.

With reference to FIG. 1 a vehicle 1, here embodied as a heavy duty truck 1, is disclosed for which an internal combustion engine system 2 of a kind disclosed in the present disclosure is advantageous. However, the internal combustion engine system 2 may as well be implemented in other types of vehicles, such as in busses, light-weight trucks, passenger cars, marine applications etc. The internal combustion engine system 2 may be based on e.g. a diesel engine, which as such may be running on several different types of fuel, such as diesel or dimethyl ether, DME. Other fuel types are well suited, as well as hybrid systems. The internal combustion engine system 2 is provided with an air intake system 3 comprising a filter system 4 with a filter housing 20 holding an air filter element (as shown in e.g. FIG. 2) of the kind disclosed herein. The air intake system 3 further comprises an air intake pipe 27 located upstream of the filter system 4, configured to draw air from the ambient by an air intake 26. The ambient air is most often in need of filtration before being directed towards an inlet of the internal combustion engine system 2 and/or any auxiliary use. Downstream the air intake 26 and air intake pipe 27 is a housing inlet 24 arranged in the air filter housing 20 to supply air to the air filter element. The air is then filtered by the air filter element and further directed through a housing outlet 23 and towards the internal combustion engine system 2. The air filter system 4 may further provide filtered air to an auxiliary component (not shown). In such cases the housing outlet 23 is a first housing outlet and the air filter housing 30 further comprises a second outlet (as shown in e.g. FIG. 3a). The filter system 4 is located in a lower region of the vehicle 1 and the air intake 26 in a higher region of the vehicle 1. In the depicted embodiment the filter system 4 is located directly behind the vehicle cab, whereas the air intake 26 is located on top of the vehicle cab at a rear end thereof. The air intake pipe 27 is located at the rear end in a generally vertical position of the vehicle cab, and the air filter housing 20 is located having its longitudinal, or axial, direction transversal to the driving direction of the vehicle 1.

Figure 2A:
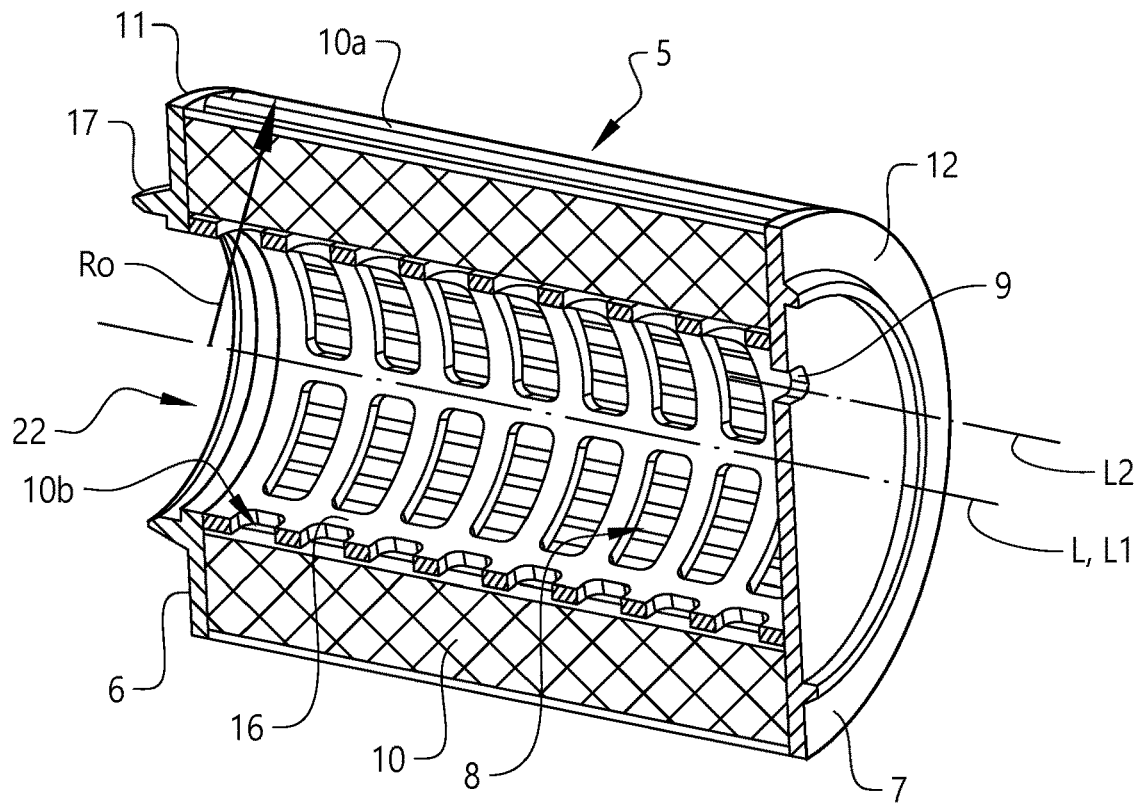
FIG. 2a is a view of a length-wise cross-section of an embodiment of an air filter element of this disclosure.
Figure 2B:
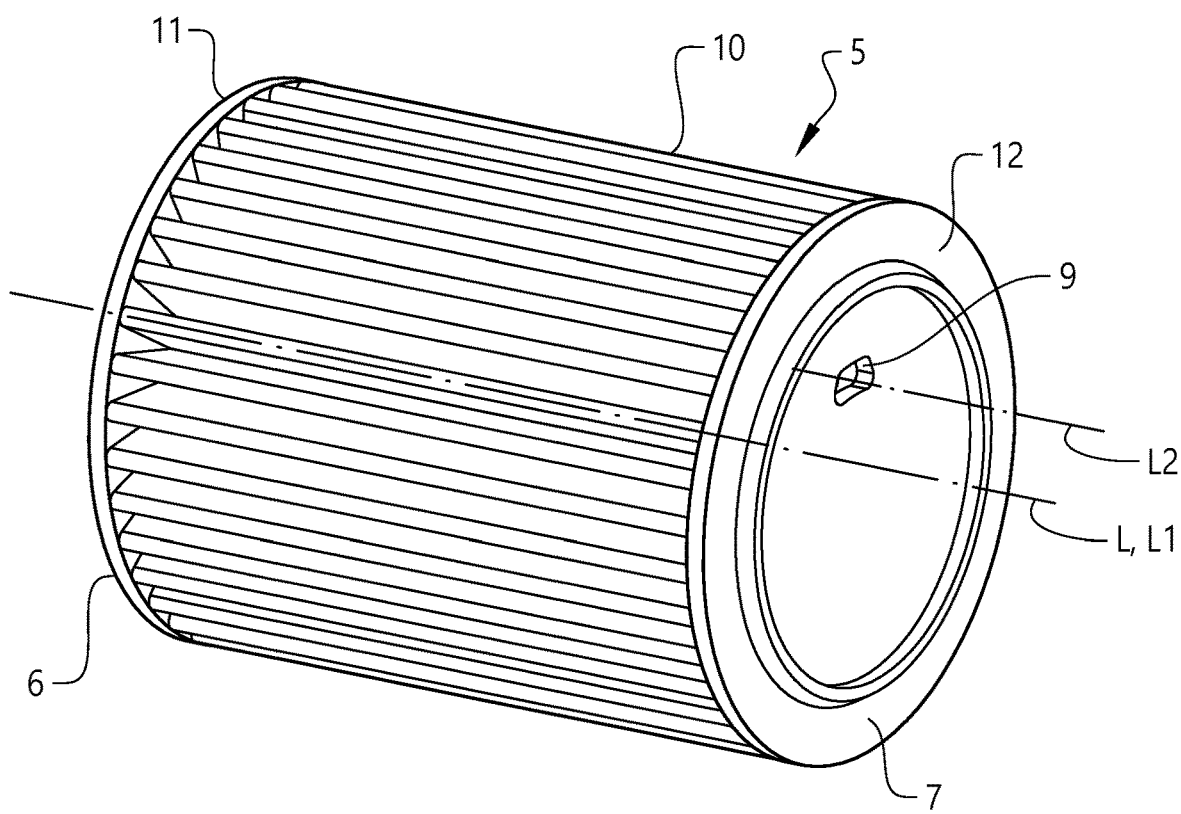
FIG. 2b is a perspective view of the air filter element of FIG. 2a, FIG. 3a is a view of a length-wise cross-section of an embodiment of an air filter housing of this disclosure.

Initially a description of a first embodiment of the present disclosure will be provided based on FIGS. 2a and 2b illustrating an air filter element 5. The air filter element 5 is adapted to be removably arranged in a filter housing 20 (shown e.g. in FIG. 3a) and comprises a filter material body 10 made of any material that is suited for the filtering operation of the air to be filtered.

The air filter element 5 has an extension in a longitudinal direction along a longitudinal centre axis L (which may also be referred to as an axial axis of the air filter element 5), and an extension in a transversal direction in a transversal plane which is perpendicular to the longitudinal direction and the longitudinal centre axis L. Such transversal plane typically includes a radial axis for a tubular, or circular cylindrical, air filter element 5 as shown in FIG. 2a.

The air filter element 5 in FIGS. 2a and 2b comprising a first end 6 and a second end 7. The second end 7 is located opposite to the first end 6 in relation to the air filter element 5 along the longitudinal centre axis L. The air filter element 5 further has a first end panel 11 at the first end 6 and a second end panel 12 at the second end 7. As will be described in more detail with reference to FIG. 4, but briefly mentioned here, the air filter element 5 is configured for axial insertion (i.e. along the longitudinal or axial direction of the air filter housing) into the air filter housing 20, with the first end 6 leading the axial insertion. Moreover, the air filter element 5 in FIGS. 2a and 2b has a circular cylindrical tubular shape defining an inner space 8, wherein a first outlet 22 and a second outlet 9 are in communication with the inner space 8, as shown in FIG. 2a. The second outlet 9 has here an offset position in relation to the first outlet 22 in the transversal direction of the air filter element 5. As seen in FIG. 2, the offset position involves a distance, and preferably is a distance, in the transversal direction of the air filter element 5. The offset position is measured as a mutual distance as seen in the transversal direction of the air filter element 5 between a centre point in the first outlet 22 and a centre point in the second outlet 9. The first outlet 22 is located coaxially with the air filter element 5, or stated differently, the centre point of the first outlet 22 is located on the longitudinal centre axis L of the air filter element 5. The offset position of the second outlet 9 in relation to the first outlet 22 is consequently in this embodiment measured as a distance in the transversal direction of the air filter element 5 between the longitudinal centre axis L of the air filter element 5 and the centre point of the second outlet 9. The first outlet 22 is adapted for conveying clean air to the internal combustion engine system 2, and the second outlet 9 is adapted for conveying clean air to an auxiliary component, such as brake compressor, which may be located within the internal combustion engine system 2, or in another position in the vehicle 1. In this embodiment, each one of the first outlet 22 and the second outlet 9, has an axial extension. Consequently, the first outlet 22 has a first centre axis L1 coinciding with the longitudinal centre axis L and a centre point of the first outlet 22, and the second outlet 9 has a second centre axis L2 coinciding with the centre point of the second outlet 9, depicted in FIG. 2a, wherein the offset position of the second outlet 9 in relation to the first outlet 22 is measured as an offset position between the second centre axis L2 in relation to the first centre axis L1 in the transversal direction of the air filter element 5.

In FIGS. 2a and 2b, the first outlet 22 is located in the first end panel 11 and the second outlet 9 is located in the second end panel 12. The first end panel 6 is arranged to block any filtered fluid to exit the air filter element 5 axially through the first end panel 11 other than through the first outlet 22. The first end panel 11 is hence located at the first end 6 such that it covers both the filter material body 10 and any parts of the inner space 8 surrounding the first outlet 22 at this end. The second end panel 12 is arranged to block any filtered fluid to exit the air filter element 5 axially through the second end panel 12 other than through the second outlet 9. The second end panel 12 is hence located at the second end 7 such that it covers both the filter material body 10 and any parts of the inner space 8 surrounding the second outlet 9 at this end. The first end panel 11 and the second end panel 12 may be made of a single panel as in the depicted embodiment, or of a combination of materials and/or sub-panels. Both the first end panel 11 and the second end panel 12 are made planar and parallel to the transversal direction of the air filter element 5.

The first outlet 22 has a cylindrical cross-section, and the second outlet 9 has a cross-sectional area which is tapering, here tapering in direction perpendicular to the second centre axis L2, and away from the centre axis L of the air filter element 5. The cross-sectional area and the hydraulic diameter of the second outlet 9 are substantially smaller than the cross-sectional area and the diameter of the inner space 8. It should be noted that the cross-sectional area and the hydraulic diameter of the second outlet 9 is substantially smaller than the cross-sectional area and the diameter of the first outlet 22, the latter being substantially the same as the cross-sectional shape and diameter of the inner space 8. The first outlet 22 is located coaxially with the air filter element 5. The air filter element 5 in FIG. 2a further comprises a sealing portion 17 arranged and configured for sealing engagement around the first outlet 22. The sealing portion 17 is typically made of a flexible rubber material which may adapt in use to a surface of the air filter housing or of a pipe portion to which it abuts.

The tapering cross-section of the second outlet 9 is here formed as a trapezoid, or truncated triangle, having a base, or first cross section boundary/side, in the transversal (or radial) direction of the air filter element 5, and two inclined cross section boundaries/sides joined by a fourth cross section boundary/side arranged opposite and parallel to the base. It should however be noted that other tapering cross-sections are within the scope of the invention. As seen in FIG. 2a, the cross-sectional area of second outlet 9 has rounded corners to provide beneficial flow conditions through the second outlet.

Furthermore, the air filter element 5 comprises a filter material body 10 arranged between the first and second ends 6, 7 of the air filter element 5. The filter material body 10 is arranged surrounding the inner space 8, and comprises an outer sleeve surface 10A configured to receive unfiltered air and being bounded by an outer filter body radius Ro. Correspondingly, the filter material body 10 comprises an inner sleeve 10B, configured to discharge, or let out, filtered air (i.e. air that has been filtered through the filter material body 10). As illustrated in FIG. 2a, the air filter element 5 of this embodiment comprises an inner portion 16 holding the filter material body 10 at the inner sleeve 10B for maintaining the shape of the air filter element 5 when air is filtered through the filter material body 10, and to avoid collapsing of the filter material body 10 due to the air pressure during use. The inner portion 16 is tubular and air permeable, and is typically made of a plastic material. The inner portion 16 is in the present embodiment made as a rectangular net, configured to maintain the shape of the air filter element 5 and not interfere the air flow through the air filter element 5. The thickness of the inner portion 16 is typically small in relation to the thickness of the filter material body 10. When the air filter element 5 is used in connection with an internal combustion engine system 2, i.e. when the filtering operation is performed on air such as ambient air, the filter material body 10 is typically made of a material such as paper or cellulose. The filter material body 10 of the depicted embodiments has a corrugated or pleated surface, but may be constructed differently and be of other suitable materials, or material combinations.

It should be understood, that the positioning the second outlet 9 in the depicted position improves the acoustic response of the air filter element 5. The air filter element 5 may consequently be used as a noise reduction means. The larger the offset between the first center axis L1 and the second axis L2, the better from a noise reduction point of view. The best noise reduction properties will be achieved when a maximum distance is used for the offset. In the depicted embodiment the second outlet 9 is hence positioned as close as possible to the inner sleeve 10B of the filter material body 10, which position is related to the hydraulic diameter of the second outlet 9. This position is achieved when the outer periphery of the second outlet 9 is located adjacent to the periphery of the inner space 8 and consequently of the inner portion 16 or inner sleeve 10B of the filter material body 10. In other words, the centre point of the second outlet 9 and thus the second centre axis L2 is located at a distance corresponding to half the hydraulic diameter of the second outlet 9 from the periphery of the inner space 8.

Correspondingly, the outer periphery of the first outlet 22 is located adjacent to the periphery of the inner space 8. Since the diameter of the first outlet 22 is substantially the same as the diameter of the inner space 8, the first outlet 22 cannot be positioned otherwise in this embodiment and hence a maximum offset position of the second outlet 9 is achieved. If however the diameter of the first outlet 22 would be less than the diameter of the inner space 8, then it would be possible to further increase the offset position between the first outlet 22 and the second outlet 9. The maximum available offset position is set by the geometrical constraints of the air filter element 5, such that the maximum available offset position equals a distance or length corresponding to the diameter of the inner space 8 subtracted by the radius, or hydraulic radius, of the outer periphery of the second outlet 9 and by the radius of the outer periphery of the first outlet 22. The offset position should be at least 50%, or preferably at least 75%, or more preferably at least 90% of the maximum available offset position.

Figure 3A:
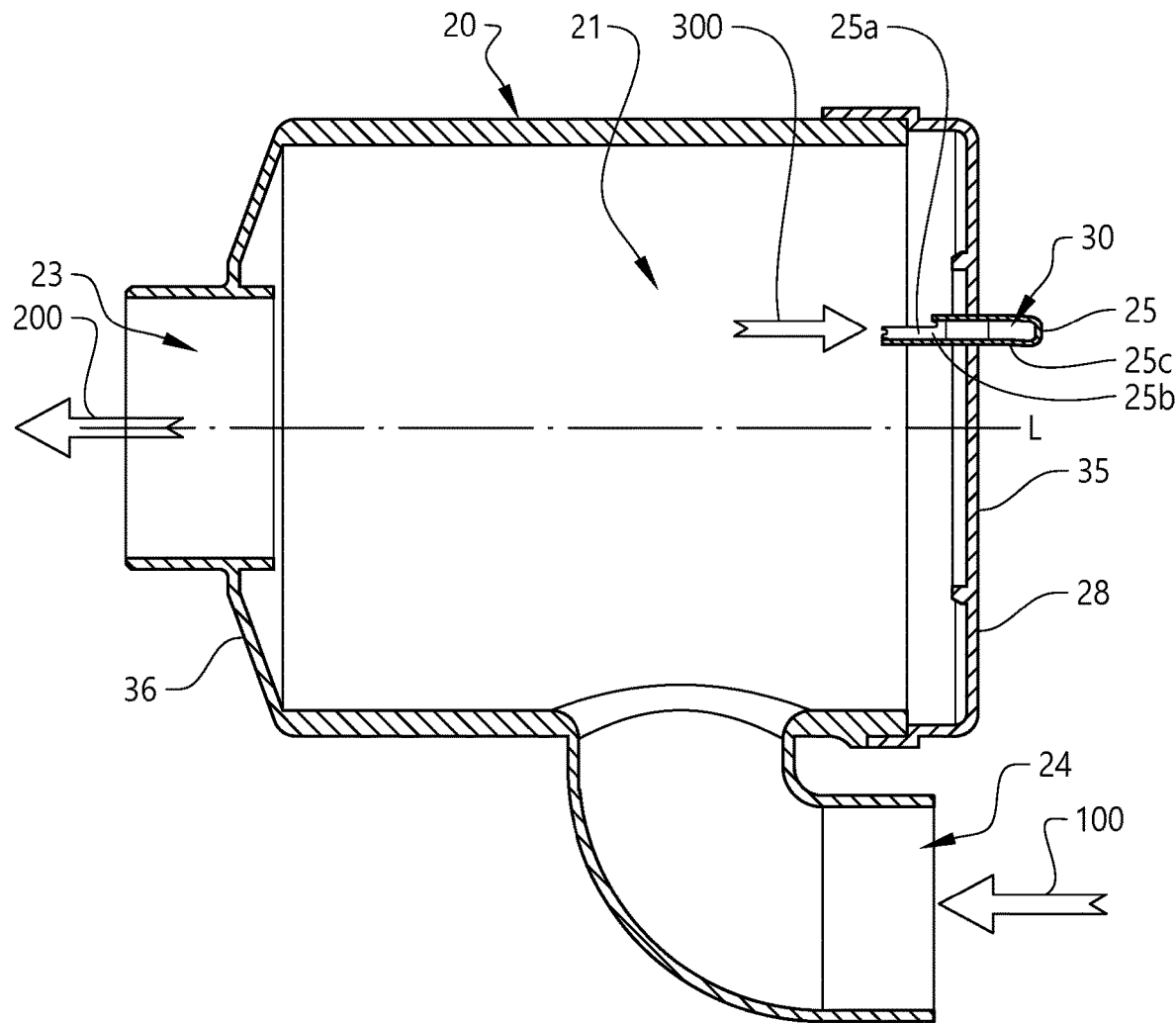
FIG. 3b is a detailed view of the outlet pipe of the air filter housing of FIG. 3a, FIGS. 3c-3d are a cross sectional views of the interaction between the second outlet of the air filter element of FIGS. 2a-2b and the outlet pipe of FIG. 3b.

Turning now to FIGS. 3a-3d, illustrating an air filter housing 20 and details thereof. In FIG. 3a a flow of air to be filtered through the filter system 4 and the air filter element 5 is disclosed in relation to the air filter housing 20. The air filter housing 20 has an extension in a longitudinal direction along a longitudinal centre axis L, and an extension in a transversal direction (e.g. radial direction) in a transversal plane which is perpendicular to the longitudinal direction and the longitudinal centre axis L. The longitudinal centre axis L of the air filter housing 20 coincides with the longitudinal centre axis L of the air filter element 5, when the air filter element 5 is inserted into the air filter housing 20. The air filter housing 20 comprises a housing inlet 24, a first housing outlet 23 and a second housing outlet 30. The housing inlet 24 is located in the curved outer periphery, or in other words, in the envelope surface of the air filter housing 20. The curved envelope surface is circular cylindrical. The housing inlet 24 is furthermore slightly inclined in relation to a normal to the outer periphery. The air filter housing 20 in FIG. 3a comprises a housing lid 35 for opening the air filter housing 20 to an inner housing space 21 which is adapted to receive the air filter element 5. The housing lid 35 is also adapted to seal the opening in the air filter housing 20 when the housing lid 35 is closed. The air filter housing 20 further has a first end 36 and a second end 28, at opposite ends of the inner housing space 21 along the longitudinal centre axis L. The housing lid 35 is part of, or even encompasses, the second end 28 of the air filter housing 20. Both the first end 36 and the second end 28 of the air filter housing 20 are generally parallel to a transversal direction of the air filter housing 20. The housing lid 35 is closed using e.g. otherwise known clips.

The first housing outlet 23 is located in the first end 36 and the second housing outlet 30 is in the embodiment shown in FIG. 3, located in the in the second end 28 comprised in the housing lid 35. In correspondence with the design of the air filter element 5, the first housing outlet 23 is located coaxially with the envelope surface of the air filter housing 20. The first housing outlet 23 has a first centre axis and the second housing outlet 30 has a second centre axis. Also, in correspondence with the design of the air filter element 5, the offset position of the second housing outlet 30 in relation to the first housing outlet 23 is defined by an offset position between the second centre axis in relation to the first centre axis in the transversal direction of the air filter housing 20. The offset position involves a distance, and preferably is a distance, in the transversal direction of the air filter housing 20. The offset position is measured as a mutual distance as seen in the transversal direction of the air filter housing 20 between a centre point in the first housing outlet 23 to a centre point in the second housing outlet 30. The second housing outlet 30 is furthermore located in a position the most far away from the housing inlet 24 in the air filter housing 20 in order to improve the acoustic response of the air filter housing 20. In order for the air filter element 5 to be installable in the air filter housing 20, the first housing outlet 23 is positioned within the air filter housing 20 in a position corresponding to the position of the first outlet 22 in the air filter element 5, and the second housing outlet 30 is positioned within the air filter housing 20 in a position corresponding to the position of the second outlet 9 in the air filter element 5.

In FIG. 3a, the air filter housing 20 further comprises an outlet pipe 25 extending from the second housing 28 end axially into the inner housing space 21 The outlet pipe 25 comprises the second housing outlet 30. The outlet pipe 25 has a centre axis corresponding to the second centre axis of the second housing outlet 30, and comprises an opening 25A configured and arranged to receive clean air from the inner housing space 21. At least an axial portion 25B of the outlet pipe 25 has a cross-sectional area along a geometrical plane perpendicular of the centre axis which is tapering (which is better shown in FIGS. 3b-3d).

Figure 3B:
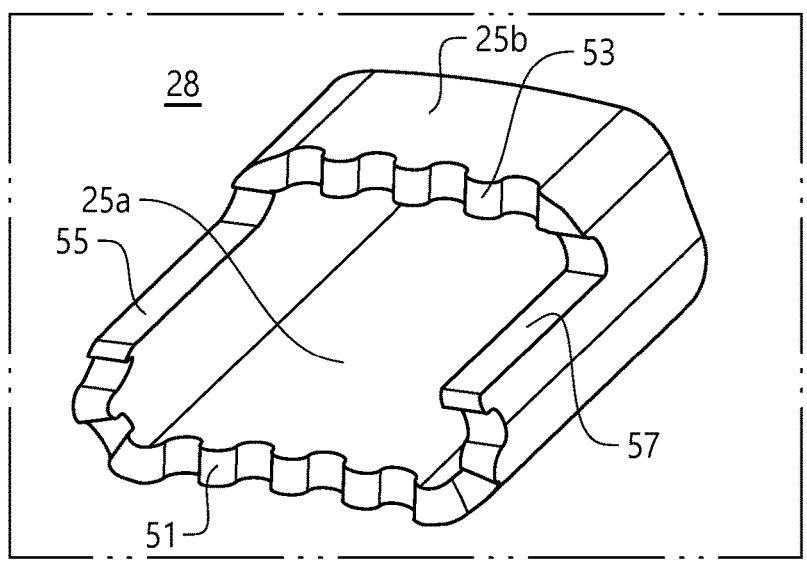

Turning to FIG. 3b illustrating the outlet pipe 25 in a perspective view. As shown, the outlet pipe 25 comprises a first leading edge 51, a second leading edge 53, a first axial edge portion 55 connecting a first end of the first leading edge 51 with a first end of the second leading edge 53, and a second axial edge portion 57 connecting a second end of the first leading edge 51 with a second end of the second leading edge 53. Hereby, the first and second leading edges 51, 53 together with the first and second axial edge portions 55, 57 define the opening 25A of the outlet pipe 25. Moreover, in FIG. 3b the axial portion 25B is shown downstream of the first and second leading edges 51, 53. Stated differently, the axial portion 25B is arranged closer to the second housing end 28 compared to the first and second leading edges 51, 53. As also seen in FIG. 3b, the second leading edge 53 is arranged closer to the second housing end 28, compared to first leading edge 51. Stated differently, an axial distance between the second leading edge 53 and the second housing end 28 is smaller than an axial distance between the first leading edge 51 and the second housing end 28. By having the first leading edge 51 arranged axially offset to the second leading edge 53 as shown in FIG. 3b, the opening 25A is at least partly extending in the axial direction. Thus, the opening 25A can be directed inside of the inner housing space 21, e.g. facing away from the longitudinal centre axis L of the air filter housing 20.

As seen in FIG. 3b, each one of the first and second leading edges 51, 53 are sinusoidal or comprises sinus-shaped portions. The sinus-shaped portions are here arranged such that the peaks and valleys of the sinus-shape are axially distant from each other. That is, the sinus-shape extends in a transversal direction of the outlet pipe. Such sinusoidal shape may reduce noise travelling through the outlet pipe 25.

Figure 3C:
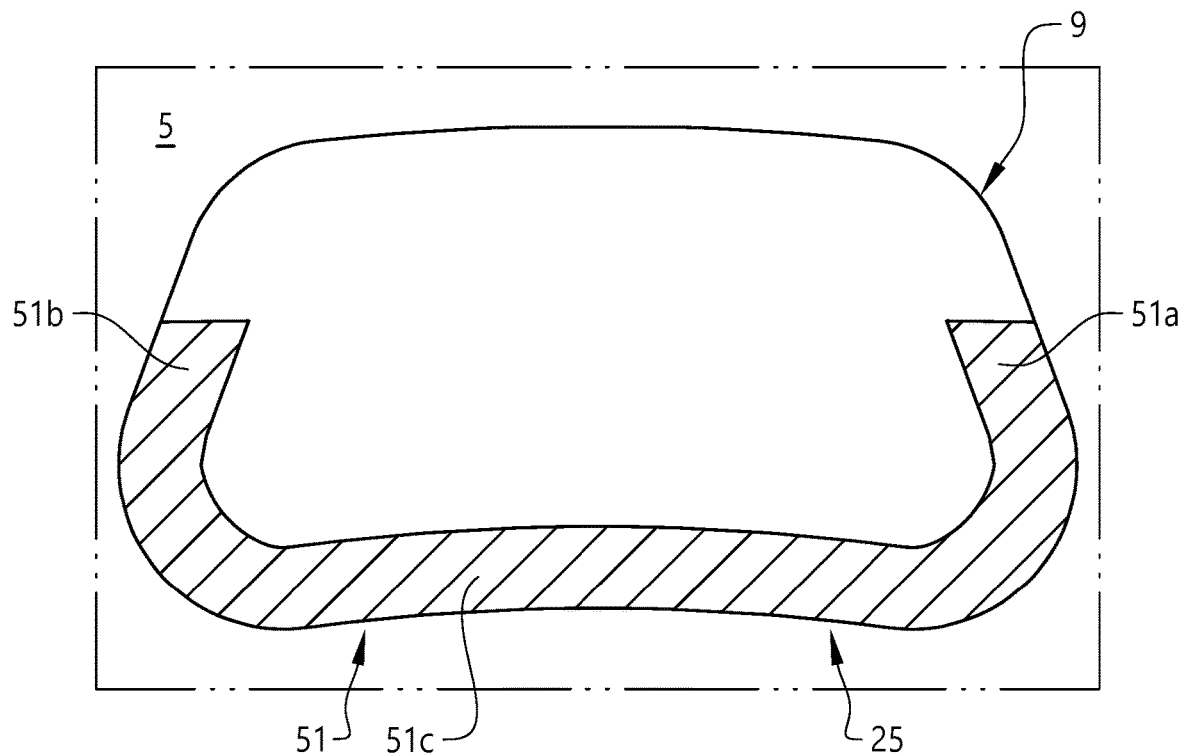
Figure 3D:
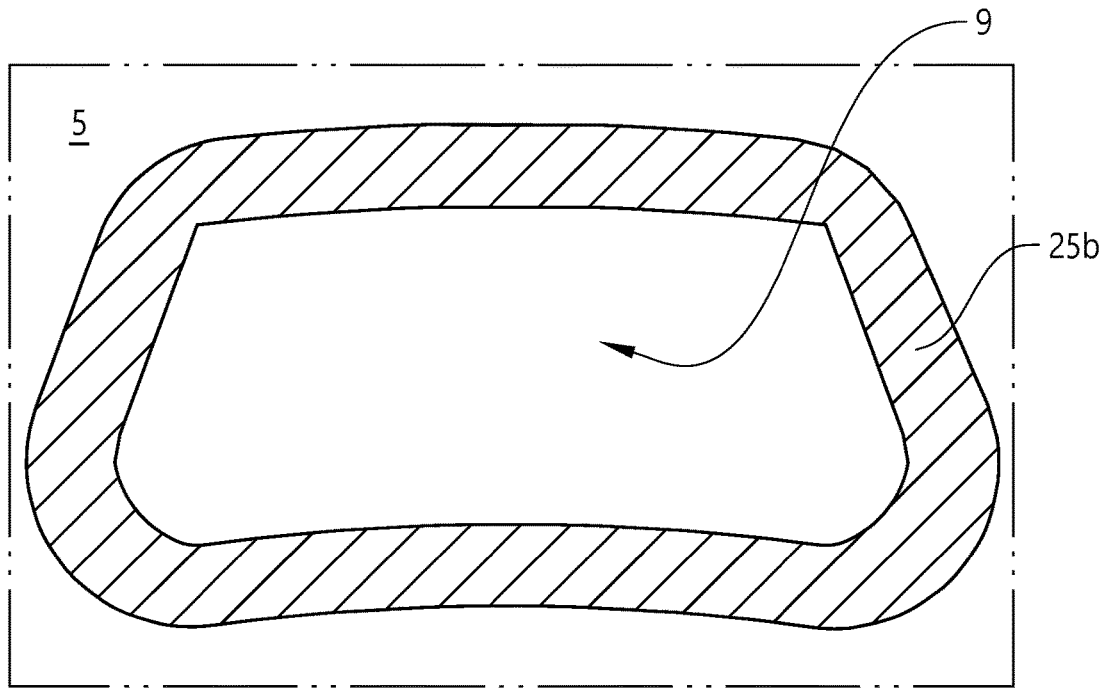

In FIGS. 3c-3d a respective cross sectional view of the interaction between the second outlet 9 of the air filter element 5 of FIGS. 2a-2b, and the outlet pipe 25 of FIGS. 3a-3b is shown. In FIG. 3c, the outlet pipe 25 has been inserted into the second outlet 9 by the first leading edge 51, and not yet by the second leading edge 53 and axial portion 25B. In FIG. 3d, the outlet pipe 25 has been further inserted into the second inlet and the axial portion 25B is fully encompassed by inner walls of the second outlet 9. Thus, the second outlet 9 of the air filter element 5 is sized and dimensioned to mate with the outlet pipe 25 of the air filter housing 20.

In FIG. 3d, is clear that the axial portion 25B of the outlet pipe 25 is configured and arranged to mate with the second outlet 9 of the air filter element 5. Hereby, the axial portion 25B of the outlet pipe 25 is configured to prevent the air filter element to rotate, or even move in the radial plane, when the air filter element 5 is installed in the air filter housing 20. As seen in FIG. 3d, the cross-sectional area of the axial portion 25B of the outlet pipe 25, and the second outlet 9, are shaped as trapezoids, or truncated triangles.

In FIG. 3c, it is shown how the first leading edge 51 leads the alignment and interconnection with the second outlet 9. Thus, it is here shown how the first leading edge 51 firstly interacts with the second outlet 9. As shown in FIG. 3c, the first leading edge comprises a first lateral portion 51A, a second lateral portion 51B, and a transversal portion 51C connecting the first lateral portion 51A with the second lateral portion 51B such that the second lateral portion 51B is located opposite to the first lateral portion 51A in relation to the transversal portion 51C. The first and second lateral portions 51A, 51B are inclined relative the transversal portion 51C with an angle of less than 80 degrees, such as about 75 degrees. Hereby, the air filter element 5 is fixated/aligned in at least two directions (typically in the radial plane) already when the first leading edge 51 has been inserted into second outlet 9. Thus, the portion of the outlet pipe comprising the first leading edge 51 may align and fixate the air filter element 5 in the air filter housing 20 in at least two directions upon entering of first leading edge 51 into the second outlet 9. Thus, the fixation, or alignment, of the air filter element 5 in the air filter housing 20 is carried out in a two-step procedure, firstly the first leading edge 51 interact with the inner walls of the second outlet 9 to initially align and fixate the air filter element 5 in the air filter housing 20. Secondly, as the outlet pipe 25 is inserted further into the second outlet 9, the axial portion 25B of the outlet pipe 25 will further, or finally, align and fixate the air filter element 5 to the air filter housing 20 owing to the matching cross-sectional areas of the axial portion 25B and the second outlet 9 of the air filter element 5.

As shown in FIG. 3a, the housing lid 35 may further comprise a pipe portion 25C arranged on the opposite side of the second housing end 28 relative the outlet pipe 25. Thus, the pipe portion 25C extends axially away from the inner housing space 21. At least one of the outlet pipe 25, and the pipe portion 25C may be made in one piece with the housing lid 35.

When in use, the air to be filtered, represented by arrow 100, enters the air filter housing 20 through the housing inlet 24, spreads around the outside of the air filter element 5 and the outer sleeve 10A of the filter material body 10, and penetrates through the air filter element 5 and the filter material body 10 such that the air is filtered. Finally, the filtered, and preferably generally cleaned, air leaves the air filter housing 20 through the first housing outlet 23 (represented by arrow 200) and the second housing outlet 30 (represented by arrow 300). The air intake pipe 27 which connects to the housing inlet 24 may be inclined such that the fluid has a flow component directed slightly towards the first housing outlet 23.

It should be noted that the air filter housing 20 may have many other designs and still maintain the filtering, noise reduction and housing function in relation to the air filter element 5.

Figure 4:
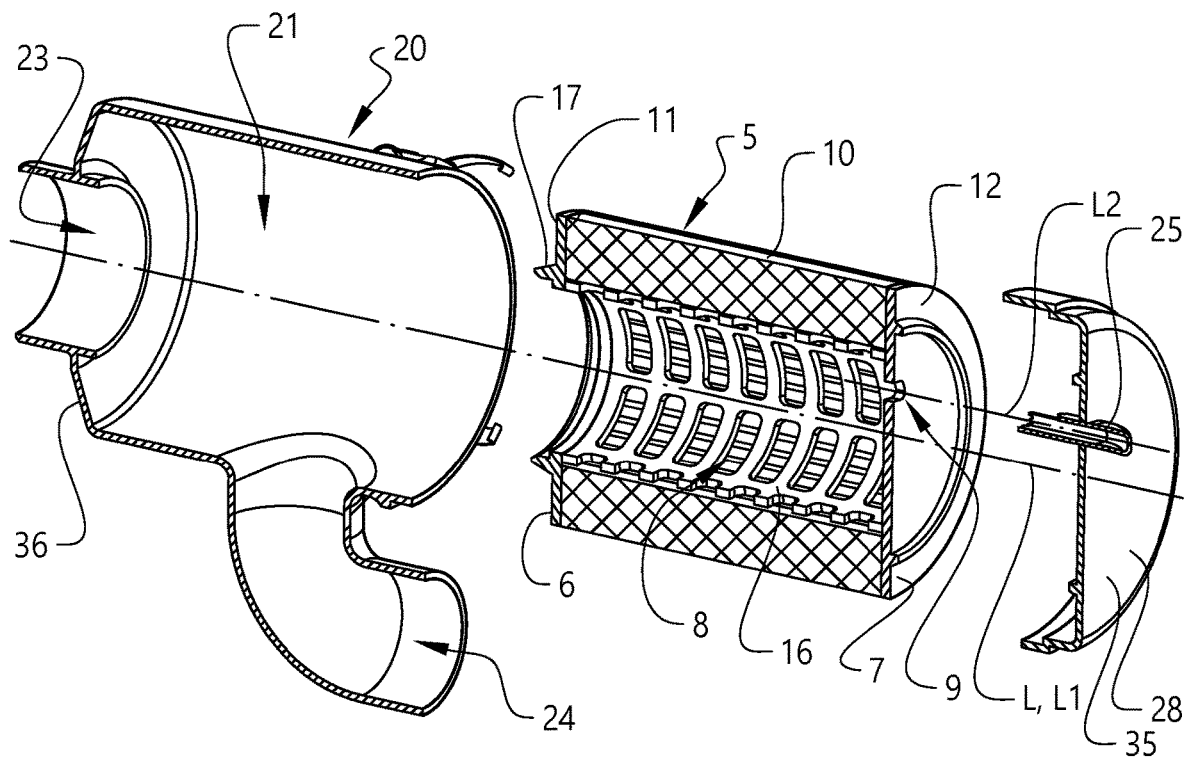
FIG. 4 illustrates an exploded length-wise cross-section of an embodiment of the air filter element installed in the air filter housing.

Turning to FIG. 4 illustrating an exploded view of the filter system 4, i.e. the air filter element 5 of FIGS. 2a-2b installed in the air filter housing 20 of FIG. 3a. Here, the air filter housing 20 and the inner housing space 21 is adapted for axial insertion and removal of the air filter element 5 into/from the inner housing space 21.

The air filter housing 20 has generally the same curved shape as the air filter element 5 in order to distribute the air well around the air filter element 5. An outer surface of the air filter element 5, typically the outer sleeve 10A of the filter material body 10, is adapted to be closely aligned with a curved inner surface of the air filter housing 20, as depicted in FIG. 4, in which the air filter element 5 is disclosed in a position installed in the air filter housing 20. The air filter housing 20 has a curved inner surface which is slightly larger than the outer curved shape of the air filter element 5, such that the air to be filtered may spread well around the air filter element 5 in order to utilise the full outer surface are of the air filter element 5. Moreover, the first end 36 of the air filter housing 20, i.e. the first housing end 36, is arranged adjacent to the first end 6 of the air filter element 5 when housed in the inner housing space 21. Correspondingly, the second end 28 of the filter housing 20, i.e. the second housing end 28, is located distant to, and opposite to, the first housing end 36 in relation to the longitudinal direction of the air filter housing 20, and is arranged adjacent to the second end 7 of the filter element 5 when housed in the inner housing space 21.

As shown in FIG. 4, the cross-sectional area of the axial portion 25B of the outlet pipe 25 is sized and dimensioned to correspond to the cross-sectional area of the second outlet 9 of the air filter element 5, as already described in relation to FIGS. 3c-3d. Hereby, the outlet pipe 25 is inserted into the second outlet 9 and thereby preventing the air filter element 5 from moving in the radial plane and also to rotate relative the air filter housing 20.

In FIG. 4, the sealing portion 17 at the first outlet 22 of the air filter element 5 is adapted in size and position to the first housing outlet 23 of the air filter housing 20 in order to seal off the inner housing space 21 from the ambient and the inner space 8 from the inner housing space 21. Thus, in FIG. 4, it is also clear that the first outlet 22, located in the first end 6 of the air filter element 5 is configured to communicate with the corresponding first housing outlet 23 in the air filter housing 20, and that the second outlet 9 located in the second end 7 of the air filter element 5 is configured to communicate with the outlet pipe 25, and corresponding second housing outlet 30, in the air filter housing 20.

Figure 5:
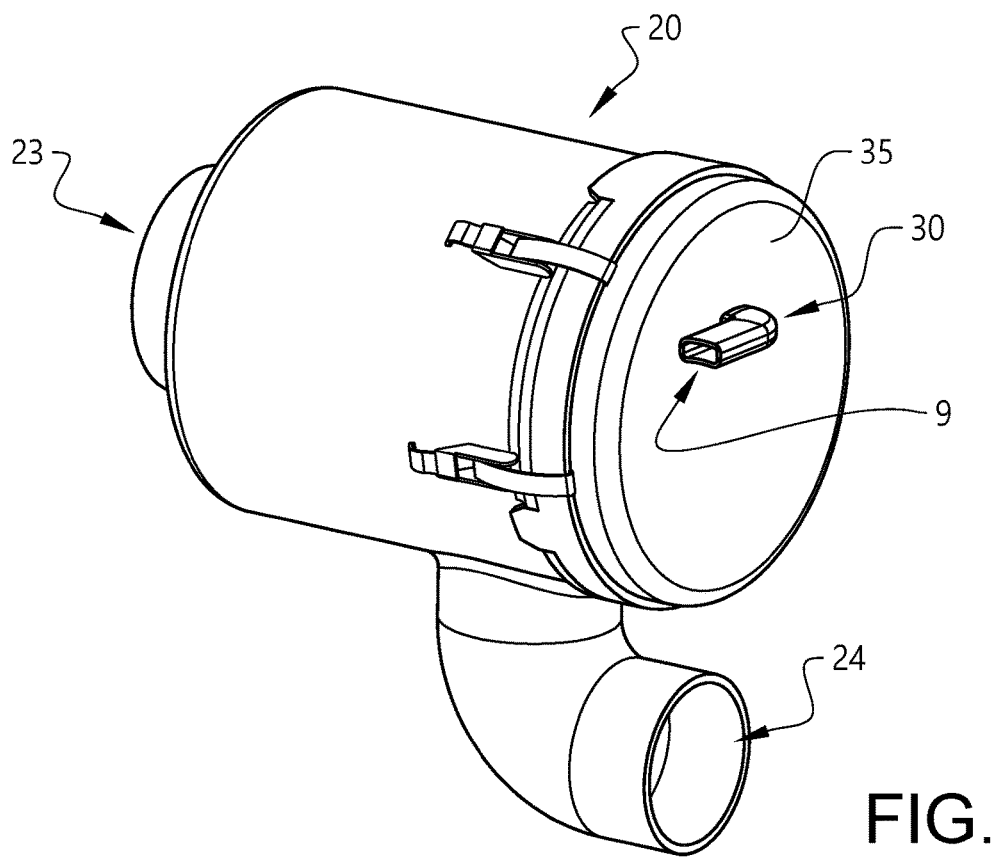
FIG. 5 is a perspective view of an embodiment of the air filter element installed in the air filter housing.

As depicted in FIG. 5 the air filter element 5 is disclosed installed in the air filter housing 20 with the housing lid 35 closed. Generally only the housing inlet 24, and first and second housing outlets 23, 30 are shown in FIG. 5.

Figure 6:
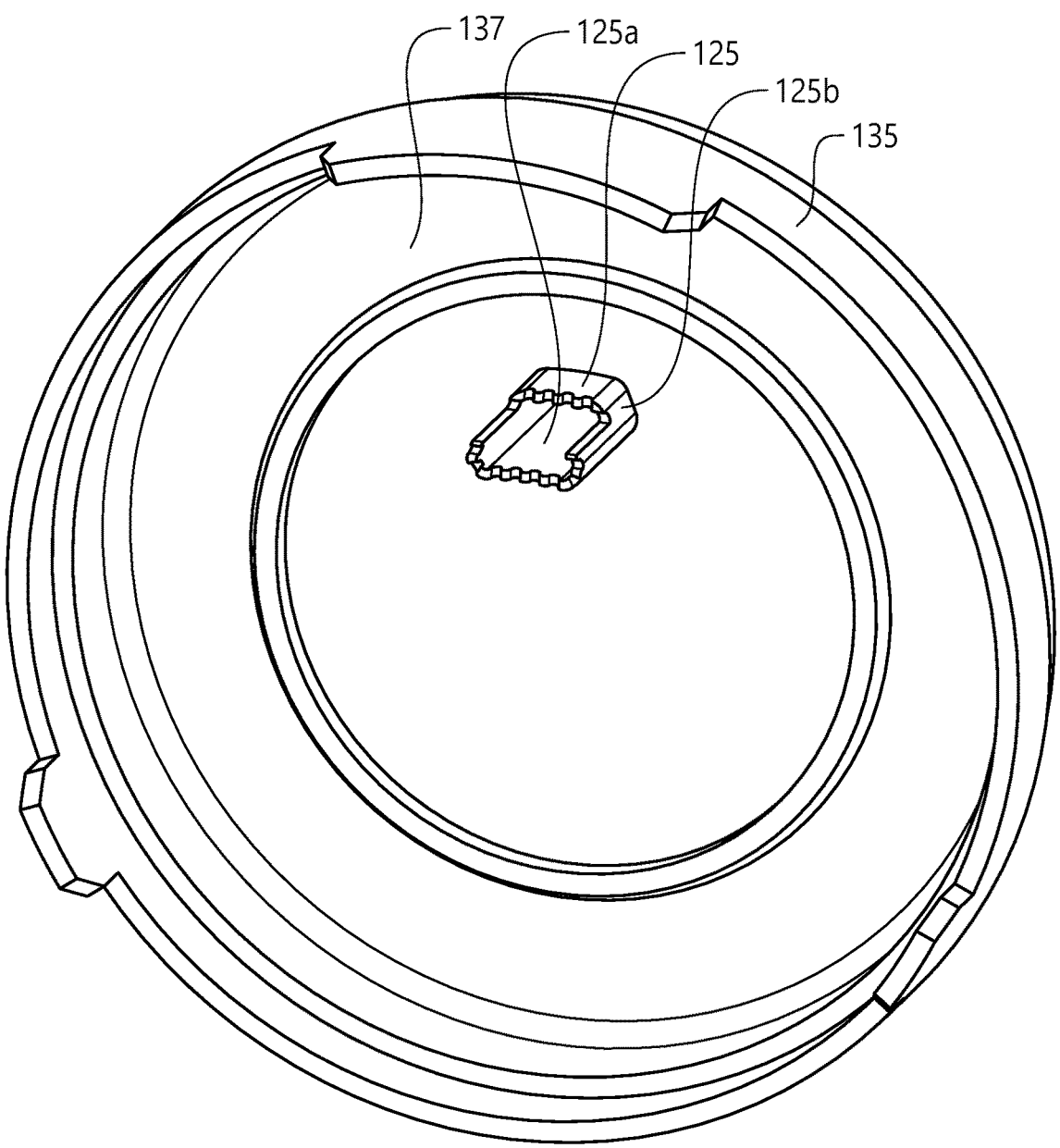
FIG. 6 illustrates the second housing end in the form of a housing lid comprising the outlet pip of FIG. 3b.

In FIG. 6 a lid 135 for an air filter housing 20 having an inner housing space 21 is shown. The lid 135 comprises a first surface 137 configured to face the inner housing space, and an outlet pipe 125 as disclosed in FIG. 3b, extending axially outwardly from the first surface 137. Corresponding to the outlet pipe 25 of FIG. 3b, the outlet pipe 125 has a centre axis and an opening 125A configured to receive clean air from the inner housing space, and comprises an axial portion 125B having a cross-sectional area along a geometrical plane perpendicular of the centre axis, which is tapering. The lid 135 in FIG. 6 may be used as the housing lid 35 in FIG. 3b.

In the above disclosed embodiments the direction of fluid flow may be opposite to the one depicted, the size of the filter housing in relation to the air filter element may be different, the material of the filter body may be other such as e.g. made of a foam material, the thickness of the air filter element may be otherwise chosen, the size and position of the first outlet, and first housing outlet, the second outlet, and the outlet pipe may be otherwise chosen, without deviating from the scope of this disclosure.

The air filter element may alternatively be called filter cartridge, filter module or filter insert.

The alternative embodiments which have been disclosed above may be combined in any way which is found advantageous, unless anything else is explicitly stated, as long as the features of the main claims are fulfilled.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An air filter housing having an inner housing space adapted to receive an air filter element, the air filter housing comprising a first housing end and a second housing end located axially opposite the first housing end in relation to the inner housing space, and an outlet pipe extending from the second housing end axially into the inner housing space, the outlet pipe having a centre axis and an opening configured to receive clean air from the inner housing space, wherein at least an axial portion of the outlet pipe has a non-circular, tapering cross-sectional area measured in a plane perpendicular to the centre axis of the outlet pipe, the cross-section being trapezoidal or truncated triangle shape.

2. The air filter housing according to claim 1, wherein the axial portion of the outlet pipe is configured and arranged to mate with a corresponding opening of the air filter element.

3. The air filter housing according to claim 2, wherein the axial portion of the outlet pipe is configured to prevent the air filter element to rotate, and/or move in a radial plan, when the air filter element is installed in the air filter housing.

4. The air filter housing according to claim 1, wherein the outlet pipe comprises a first leading edge and a second leading edge, each one of the first and second leading edges at least partly defining the opening, wherein the first and second leading edges are arranged upstream of said axial portion of the outlet pipe.

5. The air filter housing according to claim 4, wherein at least one of the first and second leading edges comprises a sinusoidal portion.

6. The air filter housing according to claim 4, wherein the first leading edge is axially offset to said second leading edge, such that the opening is at least partly extending in the axial direction.

7. The air filter housing according to claim 6, wherein the opening is facing away from a centre axis of the air filter housing.

8. The air filter housing according to claim 1, wherein the centre axis of the outlet pipe is arranged parallel to the centre axis of the air filter housing, and wherein the centre axis of the outlet pipe is offset in relation to the centre axis of the air filter housing in a direction perpendicular to the centre axes.

9. The air filter housing according to claim 1, wherein the outlet pipe is adapted for conveying clean air to an auxiliary component of a vehicle.

10. The air filter housing according to claim 1, further comprising an inlet for receiving air, and an engine outlet for conveying clean air to an engine of a vehicle, the engine outlet being located in the first housing end, wherein the outlet pipe and the engine outlet are in communication with the inner housing space, wherein the centre axis of the outlet pipe and the centre axis of the engine outlet are parallel, and arranged at an offset position in relation to one another in a direction perpendicular to the extension of the centre axes.

11. The air filter housing according to claim 1, further comprising a housing lid, the housing lid comprising the second housing end of the air filter housing and encompassing the outlet pipe.

12. An air filter element comprising a first end and a second end located opposite to the first end in relation to a longitudinal direction of the air filter element, the air filter element being configured for axial insertion into an air filter housing with the first end leading the axial insertion, wherein the air filter element comprises a first outlet located in the first end and being configured to communicate with a corresponding first housing outlet in the air filter housing, and a second outlet located in the second end and being configured to communicate with a corresponding second housing outlet in the air filter housing, wherein an axial portion of the second outlet has a non-circular, tapering cross sectional area measured in a plane perpendicular to a centre axis of the second outlet, and the cross-section is shaped as a trapezoid, or truncated triangle.

13. The air filter element according to claim 12, wherein the second outlet is configured and arranged to mate with the second housing outlet of the air filter housing.

14. The air filter element according to claim 13, wherein the second outlet is configured to prevent the air filter element to rotate, and/or move in a radial plan, when the air filter element is housed in the air filter housing.

15. An air filter system comprising an air filter element according to claim 12, and an air filter housing, wherein the second outlet of the air filter element is sized and dimensioned to mate with an outlet pipe of the air filter housing.

16. The filter system according to claim 15, in which the cross-sectional area of said axial portion of the outlet pipe is sized and dimensioned to correspond to the cross-sectional area of the second outlet of the air filter element, such that the outlet pipe, upon installation of the air filter element in the air filter housing, is inserted into the second outlet and thereby preventing the air filter element from rotate, and/or move in a radial plan, relative the air filter housing.

17. A lid for an air filter housing according claim 1, the lid comprising a first surface configured to face the inner housing space of the air filter housing, and an outlet pipe extending axially outwardly from the first surface, the outlet pipe having a centre axis and an opening configured to receive clean air from the inner housing space, wherein at least an axial portion of the outlet pipe has a cross-sectional area along a geometrical plane perpendicular of the centre axis which is tapering and is shaped as a trapezoid, or truncated triangle.

18. An internal combustion engine system comprising an air filter system according to claim 15.

19. A vehicle comprising an internal combustion engine system according to claim 18.

* * * * *